Aug. 18, 1925.
H. DE JONG
1,550,515
CORN PICKER ROLL
Filed Nov. 22, 1924    2 Sheets-Sheet 2
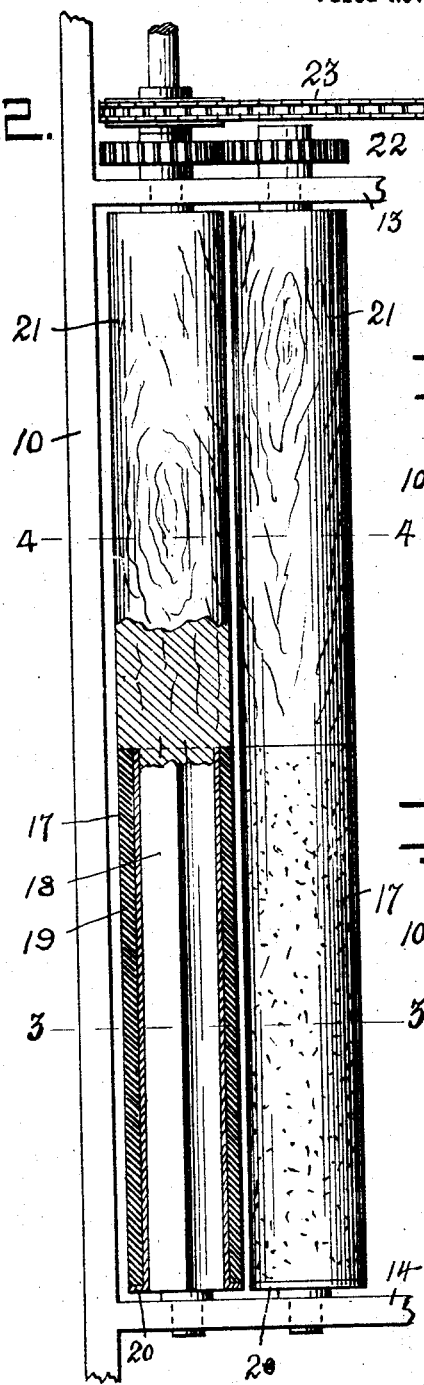
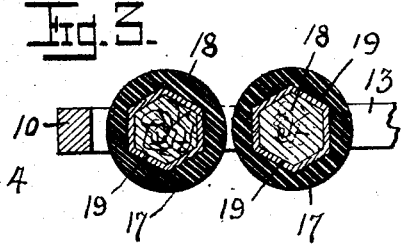
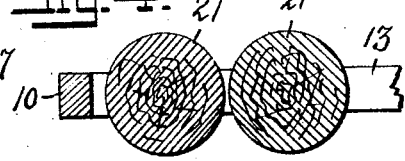
Inventor
HUBERT DE JONG
Geo. P. Kimmel
By
Attorney Patented Aug. 18, 1925.

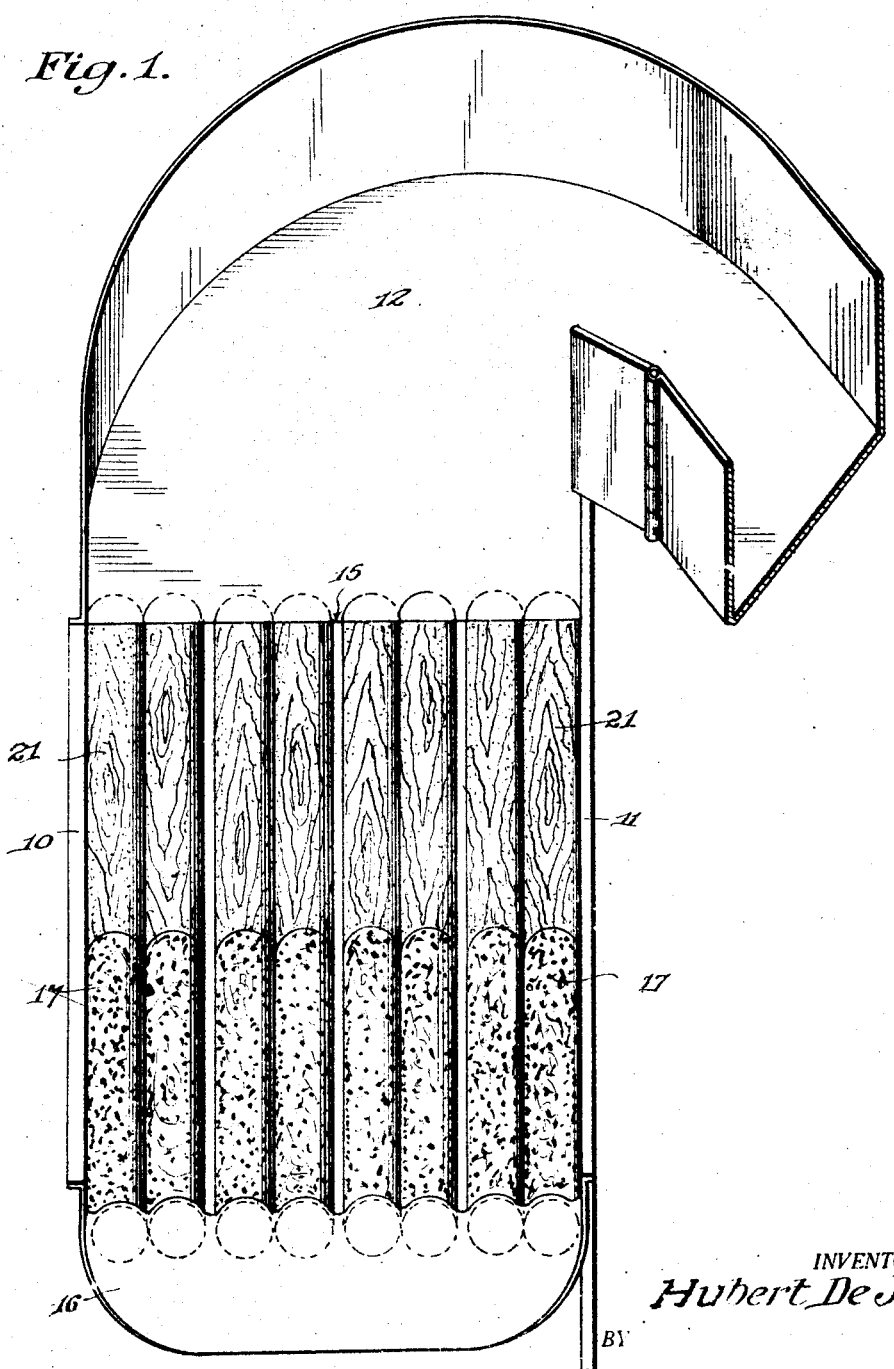

1,550,515

UNITED STATES PATENT OFFICE.

HUBERT DE JONG, OF WESSINGTON SPRINGS, SOUTH DAKOTA.

CORN-PICKER ROLL.

Application filed November 22, 1924. Serial No. 751,555.

*To all whom it may concern:*

Be it known that I, HUBERT DE JONG, a citizen of the United States, residing at Wessington Springs, in the county of Jerauld and State of South Dakota, have invented certain new and useful Improvements in Corn-Picker Rolls, of which the following is a specification.

This invention relates to husking rolls of corn pickers, and has for one of its objects to improve the construction and increase the efficiency and utility of devices of this character.

Another object of the invention is to provide a device of this character constructed with a part of each roll of unyielding material and the remainder of yieldable material, and with means for renewing the yieldable material without discarding the other portions.

With these and other objects in view, the invention consists in certain novel features of construction as hereinafter shown and described and then specifically pointed out in the claims, and in the drawings illustrative of the preferred embodiment of the invention—

Figure 1 is a plan view of a portion of the picker part of a corn harvester with a set of the improved rolls installed therein.

Figure 2 is a plan view on an enlarged scale of a pair of the improved rolls partly in section.

Figure 3 is a transverse section on the line 3—3 of Figure 2.

Figure 4 is a transverse section on the line 4—4 of Figure 2.

The improved picker rolls are preferably installed in the usual manner in the picker frame portion of a corn harvester, but may be installed in a special supporting frame, and operative separately from the snapper roll mechanism, but for the purpose of illustration is shown arranged in a conventional picker roll frame including the main side members 10 and 11, with a part of the guide chute from the snapper rolls at 12.

The rolls are shown arranged in coacting pairs, four pairs being shown in Figure 1, and journalled at the ends in transverse members 13 and 14.

The rolls are set at an incline, and the floor of the chute 12 overlaps the upper or higher ends of the rolls as indicated at 15, while a gather member 16 usually of sheet metal, overlaps the rolls at their lower ends to guide the husked ears from the rolls.

Each roll is formed with an upper portion 21 of unyielding material, preferably of wood, and cylindrical transversely.

The upper portion of each roll is formed with a reduced portion 18 of other form than round, for instance hexagonal as indicated in Figure 3, and enclosed by a metal sheathing, represented at 19, the latter conforming to and closely engaging the portion 18 and formed with an outstanding stop flange 20 at the lower end.

Enclosing the metal sheathing 18 is a tubular body of relatively soft rubber or the like, and represented as a whole at 17 and conforming interiorly to and closely engaging the sheathing 18 and conforming to and constituting a continuation of the upper cylindrical portion 21, as shown. The members 17 bear at their lower ends against the stop flanges 20, and are prevented thereby from displacement longitudinally of the roll.

The two portions of each roll are preferably of the same length, usually about one and one-half feet, or three feet altogether.

The rolls are shown arranged to be rotated toward each other by gears 22, and chains 23 in the usual manner.

As the machine is moved forwardly the ears are received from the snapping rolls, not shown, over the chute 12 and are first engaged by the unyielding portions 21 of the rolls, then pass to the yielding portions 17 of the rolls where the husks are stripped from the ears without shelling the corn, and thence to the elevator, the latter not being shown, as it forms no part of the present invention.

The yieldable member 17 may be applied to the sheathing member 19 before the latter is applied to the reduced portion 18 of the body, and in event of the impairment of the yieldable member the same can be readily renewed by simply withdrawing the sheathing and the yieldable body carried thereby, replacing the impaired member with an unimpaired member, and replacing the sheathing and its attachment.

The improved device is simple in construction, can be inexpensively manufactured, and adapted without material structural change to picker or husking machines of various forms.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed is:

1. A husking roll comprising a body of non-yieldable material with one portion cylindrical and another portion reduced, a tubular metal sheathing corresponding to and adapted to closely engage the reduced portion of the body and held from rotation thereon and a yieldable tubular member with its exterior cylindrical end corresponding to the cylindrical portion of the body and its interior corresponding to the sheathing and engaging the same, the outer face of the yieldable member coinciding with and forming a continuation of the non-yieldable portion of the body when the sheathing is disposed over the reduced portion of the same.

2. A husking roll comprising a body of non-yieldable material with one portion cylindrical and another portion reduced, a tubular metal sheathing corresponding to and adapted to closely engage the reduced portion of the body with an outstanding flange at one end thereof, said sheathing being held from rotation on the body, and a yieldable tubular member with its exterior cylindrical end corresponding to the cylindrical portion of the body and its interior corresponding to the sheathing and engaging the same, the outer face of the yieldable member coinciding with and forming a continuation of the non-yieldable portion of the body when the sheathing is disposed over the reduced portion of the same.

In testimony whereof I affix my signature hereto.

HUBERT DE JONG.